United States Patent
Kim et al.

(10) Patent No.: US 9,125,029 B2
(45) Date of Patent: Sep. 1, 2015

(54) MOBILE TERMINAL AND METHOD FOR RECEIVING AN INCOMING CALL

(71) Applicant: LG ELECTRONICS INC., Seoul (KR)

(72) Inventors: Youngki Kim, Seoul (KR); Seungjin Choi, Seoul (KR); Dongo Yi, Seoul (KR); Changik Jeong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 220 days.

(21) Appl. No.: 13/780,873

(22) Filed: Feb. 28, 2013

(65) Prior Publication Data
US 2014/0155039 A1   Jun. 5, 2014

(30) Foreign Application Priority Data
Dec. 4, 2012   (KR) .................. 10-2012-0139887

(51) Int. Cl.
  *H04W 4/12*  (2009.01)
  *H04M 1/64*  (2006.01)
  *H04M 1/725* (2006.01)

(52) U.S. Cl.
  CPC ............ *H04W 4/12* (2013.01); *H04M 1/64* (2013.01); *H04M 1/645* (2013.01); *H04M 1/72552* (2013.01); *H04M 1/72583* (2013.01); *H04M 2250/22* (2013.01); *H04M 2250/74* (2013.01)

(58) Field of Classification Search
  CPC .............. H04M 3/42; H04M 3/42042; H04M 3/42093; H04M 3/428; H04M 1/64; G06F 3/0482; G06F 3/04847; G06F 3/0488; H04W 4/12

USPC .......... 455/412.1; 379/142.06; 715/810, 828, 715/833
See application file for complete search history.

(56) References Cited

U.S. PATENT DOCUMENTS

| | | | |
|---|---|---|---|
| 5,140,439 A * | 8/1992 | Tanaka ......................... 358/405 |
| 2005/0008141 A1* | 1/2005 | Kortum et al. ........... 379/266.06 |
| 2005/0124324 A1* | 6/2005 | Thomas et al. ............ 455/412.1 |
| 2006/0045240 A1 | 3/2006 | Buchner |
| 2006/0098792 A1* | 5/2006 | Frank et al. ..................... 379/70 |
| 2008/0132253 A1 | 6/2008 | Cho |
| 2009/0187956 A1* | 7/2009 | Sommer ....................... 725/106 |
| 2010/0208879 A1* | 8/2010 | Meriaz et al. ............ 379/201.02 |
| 2011/0170680 A1* | 7/2011 | Chislett et al. ........... 379/142.06 |
| 2011/0202879 A1* | 8/2011 | Stovicek et al. .............. 715/828 |
| 2011/0246943 A1* | 10/2011 | Fujibayashi .................. 715/833 |

FOREIGN PATENT DOCUMENTS

| | | |
|---|---|---|
| EP | 0989716 A1 | 3/2000 |
| EP | 1296501 A1 | 3/2003 |

* cited by examiner

*Primary Examiner* — Nathan Mitchell
*Assistant Examiner* — Ernest Tacsik
(74) *Attorney, Agent, or Firm* — Birch, Stewart, Kolasch & Birch, LLP (57) ABSTRACT

There is discussed according to an embodiment a method for receiving an incoming call with a mobile terminal includes steps of: receiving an incoming call signal; displaying a receiving delay button on a display unit; allowing a call receiver to select the receiving delay button; sending a predetermined comment to a caller; and converting the caller's voice into a text message and displaying a text message on the display unit, such that the call receiver may not run to answer the call and may delay the call for a preset time period when the call receiver receives the call received by the mobile terminal while moving.

15 Claims, 12 Drawing Sheets

MOBILE TERMINAL AND METHOD FOR RECEIVING AN INCOMING CALL

Pursuant to 35 U.S.C. §119(a), this application claims the benefit of earlier filing date and right of priority to Korean Application No. 10-2012-0139887, filed on Dec. 4, 2012, the contents of which are hereby incorporated by reference herein in their entirety.

BACKGROUND OF THE DISCLOSURE

1. Field of the Disclosure

The present invention relates to a mobile terminal that is able to delay an incoming call before receiving and a method for receiving a call using the mobile terminal.

2. Discussion of the Related Art

Generally, terminals can be classified into mobile terminals and stationary terminals. In addition, the mobile terminals can be further classified into handheld terminals and vehicle mount terminals.

Further, a mobile terminal is a device which may be configured to perform various functions such as data and voice communications, capturing images and video via a camera, recording audio, playing music files and outputting music via a speaker system, and displaying images and video on a display.

As mobile terminals are becoming popular, anyone can make a call anywhere anytime. However, a user of such a mobile terminal has to move somewhere quiet to receive a call if he is in a place where calling is not allowed such as a classroom and a conference room.

At this time, if a moving distance increases, the incoming call might be disconnected and the user has to make a call again inconveniently. If the number of that disconnected call is caller-identification-restricted or unknowable, the user cannot make a call again. Also, if the disconnected call is from overseas, it is difficult to identify the number of the call and to make a call again.

SUMMARY OF THE DISCLOSURE

Accordingly, the present invention is directed to a mobile terminal that substantially obviates one or more problems due to limitations and disadvantages of the related art. An object of the present invention is to provide a mobile terminal that is able to delay an incoming call before receiving and a method for receiving a call using the mobile terminal.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for receiving a call with a mobile terminal includes steps of: receiving a call signal; displaying a receiving delay button on a display unit; allowing a call receiver to select the receiving delay button; sending a predetermined comment to a caller; and converting the caller's voice into a text message and displaying a text message on the display unit.

In another aspect of the present invention, a mobile terminal includes a display unit configured to display a receiving delay button on a screen when receiving a call signal; a wireless signal receiving unit configured to receive a phone number of a call or a caller's voice; a wireless signal transmitting unit configured to transmit a predetermined comment when the receiving delay button is selected; and a controller configured to control a wireless signal transmitting unit to transmit a predetermined comment, when a call receiver selects the receiving delay button after the call signal is received, and to convert a caller's voice into a text message to display the text message on the display unit, when a caller's voice is received during the receiving delay.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DESCRIPTION OF SPECIFIC EMBODIMENTS

In the following detailed description, reference is made to the accompanying drawing figures which form a part hereof, and which show by way of illustration specific embodiments of the invention.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of mobile terminals. Examples of such terminals include mobile phones, user equipment, smart phones, digital broadcast receivers, personal digital assistants, laptop computers, portable multimedia players (PMP), navigators and the like.

Yet, it is apparent to those skilled in the art that a configuration according to an embodiment disclosed in this specification is applicable to such a fixed terminal as a digital TV, a desktop computer and the like as well as a mobile terminal.

Figure 1:
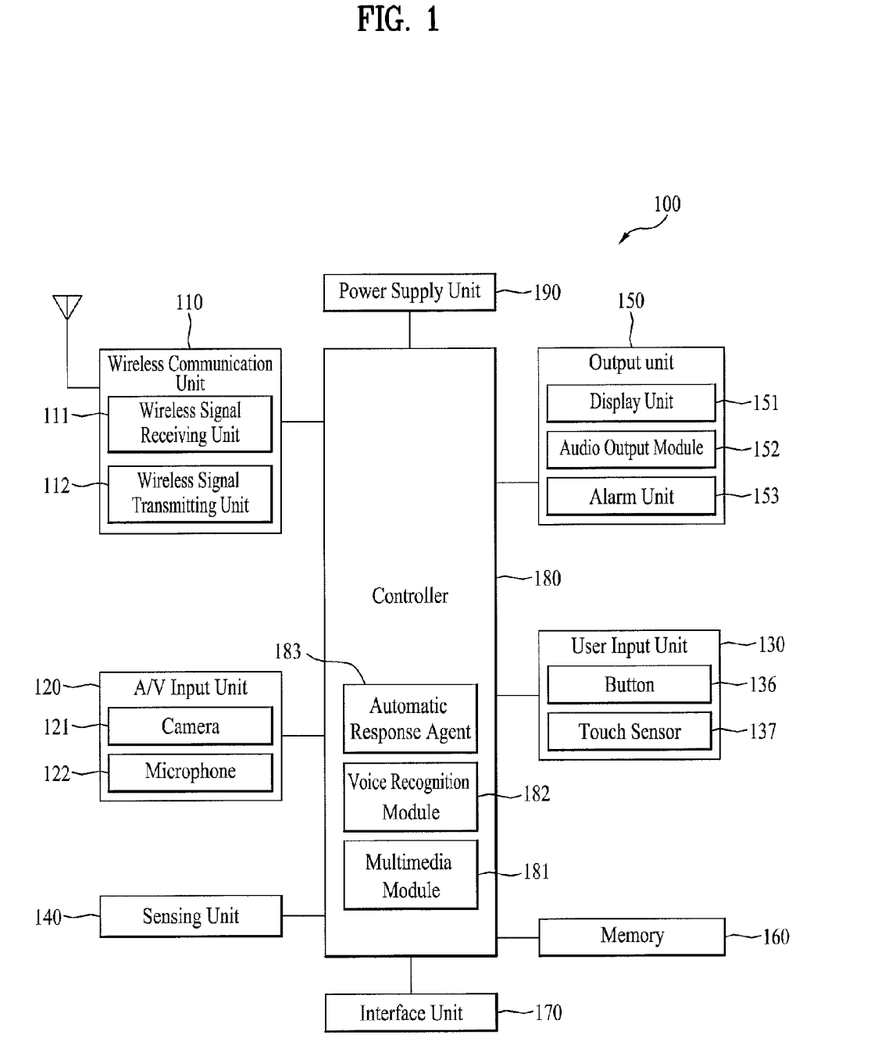
FIG. 1 is a block diagram illustrating a mobile terminal according to one aspect of the present invention.

FIG. 1 is a block diagram of a mobile terminal 100 in accordance with an embodiment of the present invention. FIG. 1 shows the mobile terminal 100 according to one embodiment of the present invention includes a wireless communication unit 110, an A/V (audio/video) input unit 120, a user input unit 130, a sensing unit 140/141, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located.

The wireless communication unit 110 transmits/receives wireless signals to/from one or more network entities (e.g., base station, external terminal, server, etc.) via a mobile network such as GSM (Global System for Mobile communications), CDMA (Code Division Multiple Access), WCDMA (Wideband CDMA) and so on. Such wireless signals may represent audio, video, and data according to text/multimedia message transmission and reception, among others.

A wireless signal receiving unit 111 and a wireless signal transmitting unit 112 are divided according to reception or transmission of a wireless signal. However, the wireless signal receiving unit 111 and the wireless signal transmitting unit 112 may be substantially one member.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. In addition, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a button 136 provided to front/rear/lateral side of the mobile terminal 100 and a touch sensor (pressure sensitive touch/capacitive touch) 137 and may further include a key pad, a dome switch, a jog wheel, a jog switch and the like [not shown in the drawing].

The sensing unit 140/141 provides sensing signals for controlling operations of the mobile terminal 100 using status measurements of various aspects of the mobile terminal. For instance, the sensing unit 140/141 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100.

The output unit 150 generates outputs relevant to the senses of sight, hearing, touch and the like. And, the output unit 150 includes the display 151, an audio output module 152, an alarm unit 153, and a haptic module 154 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittable type, which can be named a transparent display. As a representative example for the transparent display, there is TOLED (transparent OLED) or the like. A rear configuration of the display 151 can be implemented in the optical transmittive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and the touch sensor 137 configures a mutual layer structure (hereinafter called 'touch screen'), it is able to use the display 151 as an input device as well as an output device. In this case, the touch sensor can be configured as a touch film, a touch sheet, a touchpad or the like.

The touch sensor 137 can be configured to convert a pressure applied to a specific portion of the display 151 or a variation of a capacitance generated from a specific portion of the display 151 to an electric input signal. Moreover, it is able to configure the touch sensor 137 to detect a pressure of a touch as well as a touched position or size.

If a touch input is made to the touch sensor 137, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be output via the display 151 or the audio output unit 152. Hence, the display 151 or the audio output module 152 can be regarded as a part of the alarm unit 153.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), moving pictures, etc. In addition, a recent use history or a cumulative use frequency of each data (e.g., use frequency for each phonebook, each message or each multimedia) can be stored in the memory unit 160. Moreover, data for various patterns of vibration and/or sound output in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. In addition, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices.

The interface unit 170 may be configured using a wired/wireless headset port, an external charger port, a wired/wireless data port, a memory card port, a port for coupling to a device having an identity module, audio input/output ports, video input/output ports, an earphone port and/or the like.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern (or image) recognizing process for recognizing a writing input and a picture drawing input carried out on the touchscreen as characters or images, respectively.

The controller 180 may further include a voice recognition module 182. Such a voice recognition module 182 may recognize and convert a human voice into text, only to recognize the text as an implementation command or to record it as a text message. The user can implement a function of the mobile terminal or create a text message with his or her voice via the voice recognition module 182, such that he or she can use the mobile terminal rapidly and conveniently. The voice recognition module 182 is configured to convert a human voice into text, like TTS (Text To Speech) which will be described later.

An automatic-response agent 183 is an artificial intelligence system that is able to analyze a natural language to respond to the result of the analysis. In case a natural language is a digital text, the automatic response agent 183 analyzes the digital text as it is. In case the natural language is a human voice, the automatic response agent 183 allows the voice recognition module 182 to convert the human voice into a digital text to analyze. The natural language is analyzed to extract or combine a natural response as if making conversation with a human.

The power supply unit 190 provides power required by the various components for the mobile terminal 100. The power may be internal power, external power, or combinations thereof.

A battery may include a built-in rechargeable battery and may be detachably attached to the terminal body for a charging and the like. A connecting port may be configured as one example of the interface 170 via which an external charger for supplying a power of a battery charging is electrically connected.

Various embodiments described herein may be implemented in a computer-readable medium using, for example, computer software, hardware, or some combination thereof.

Figure 2:
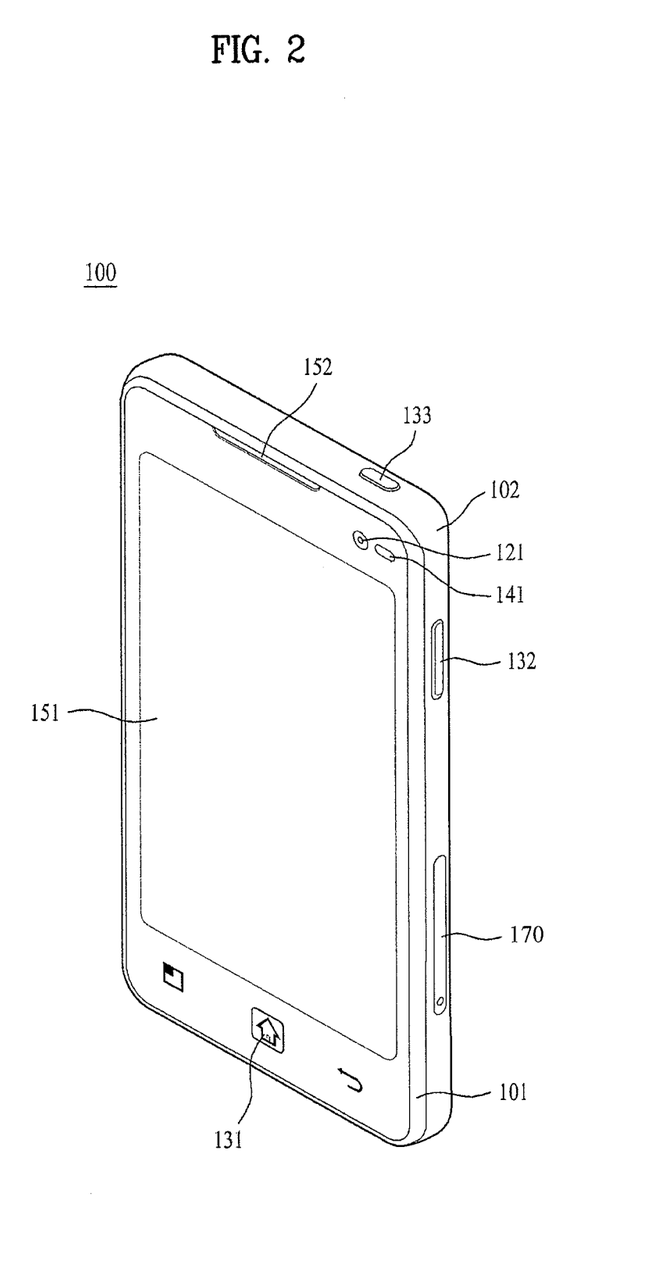
FIG. 2 is a front perspective view illustrating the mobile terminal according to one aspect of the present invention.

Next, FIG. 2 is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2, the mobile terminal 100 includes a case 101 and 102 configuring an exterior thereof. In the present embodiment, the case can be divided into a front case 101 and a rear case 102. Various electric/electronic parts are loaded in a space provided between the front and rear cases 101 and 102.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Occasionally, electronic components can be mounted on a surface of the rear case 102. The electronic part mounted on the surface of the rear case 102 may include such a detachable part such as a battery, a USIM card, a memory card and the like. In doing so, the rear case 102 may further include a backside cover configured to cover the surface of the rear case 102. In particular, the backside cover has a detachable configuration for the user's convenience. If the backside cover is detached from the rear case 102, the surface of the rear case 102 is exposed.

If the backside cover is attached to the rear case 102, a lateral side of the rear case 102 may be exposed in part. If a size of the backside cover is decreased, a rear side of the rear case 102 may be exposed in part. If the backside cover covers the whole rear side of the rear case 102, it may include an opening configured to expose a camera or an audio output unit externally.

The cases 101 and 102 can be formed by injection molding of synthetic resin or can be formed of metal substance such as stainless steel (STS), titanium (Ti) or the like for example.

A display 151, an audio output unit 152, a camera 121, user input units 130/131 and 132, a microphone 122, an interface 170 and the like can be provided to the case 101 or 102.

The display 151 occupies most of a main face of the front case 101. The audio output unit 152 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content input by the first or second manipulating unit 131 or 132 can be diversely set. For instance, such a command as start, end, scroll and the like is input to the first manipulating unit 131. In addition, a command for a volume adjustment of sound output from the audio output unit 152 and the like can be input to the second manipulating unit 132, a command for a switching to a touch recognizing mode of the display 151 and the like can be input to the second manipulating unit 133.

A button type is configured to recognize a pressure applied by a user to each of the manipulation units 131, 132 and 133. If a touch sensor is provided to each of the manipulation units 131, 132 and 133 in addition to the display unit 151, a user's command can be inputted by a user's touch.

Figure 3:
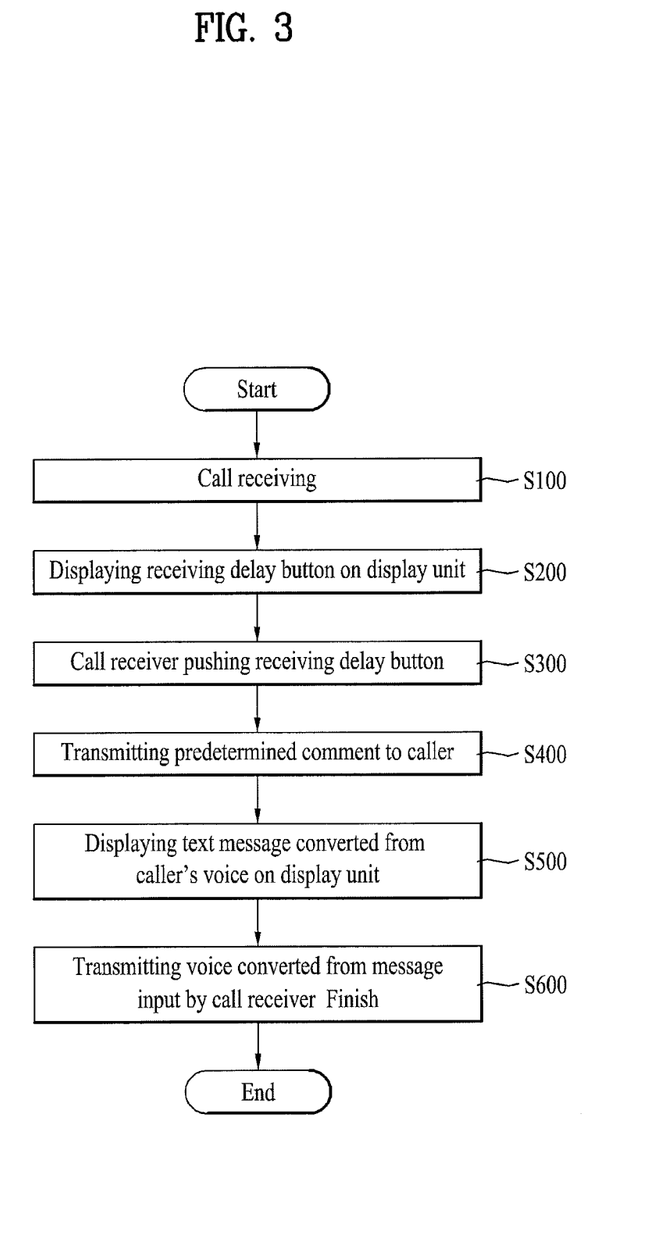
FIG. 3 is a flow chart illustrating a method for receiving a call according to another aspect of the present invention.
Figure 4A:
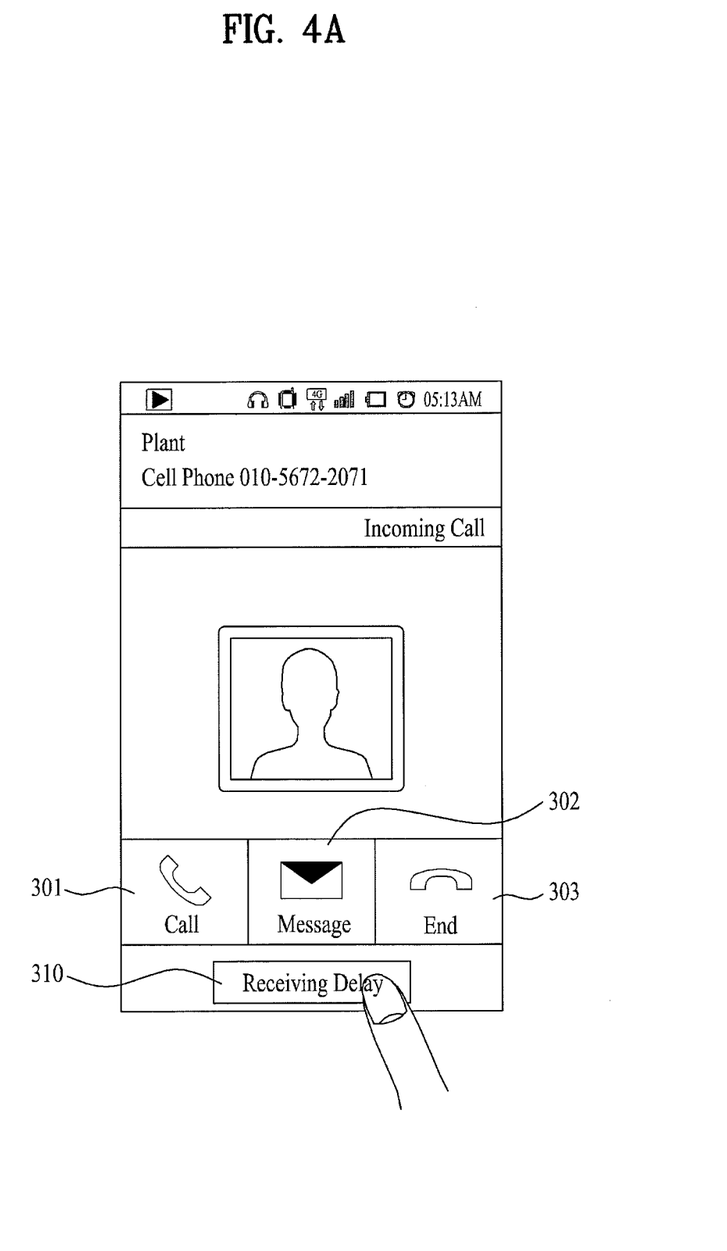
FIGS. 4a and 4b are diagrams illustrating one embodiment of a call receiving screen in the method for receiving a call according to another aspect of the present invention.
Figure 4B:
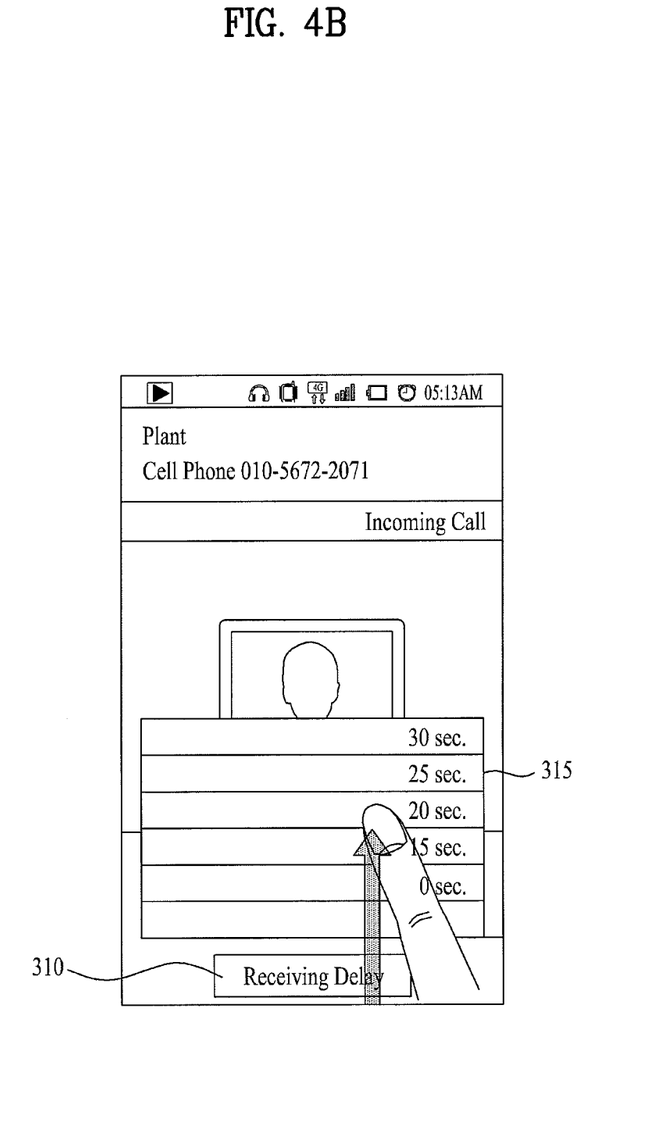
Figure 5A:
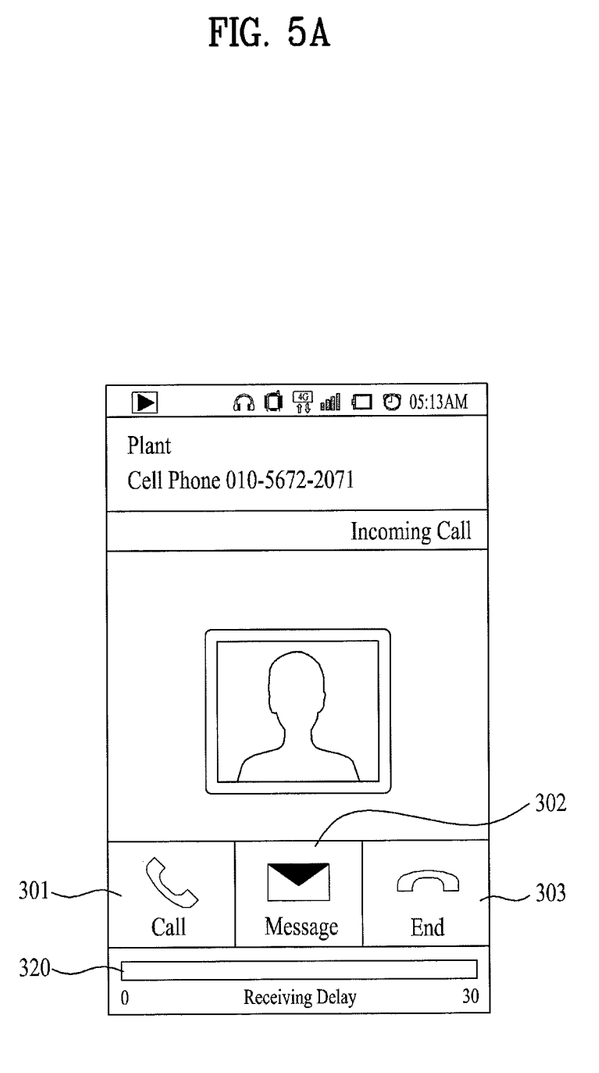
FIGS. 5a to 5c are diagrams illustrating another embodiment of a call receiving screen in the method for receiving a call according to another aspect of the present invention.
Figure 5B:
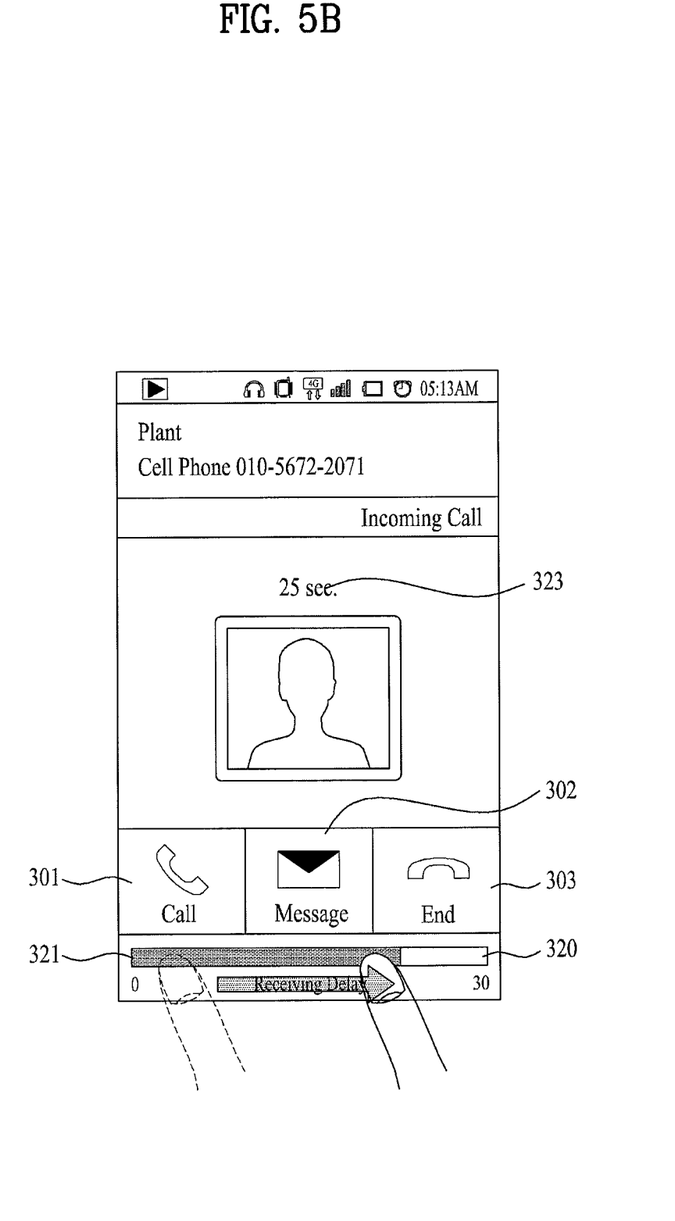
Figure 5C:
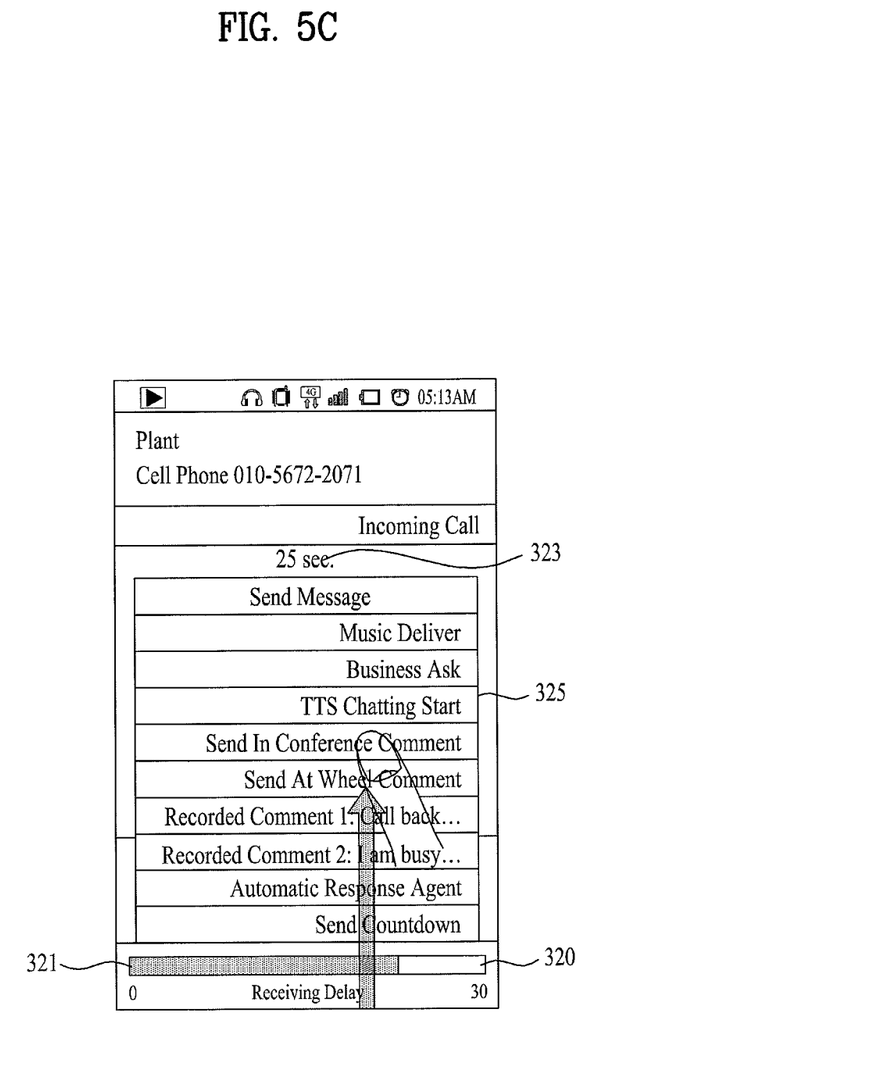

FIG. 3 is a flow chart illustrating a method of receiving a call according to the present invention. FIGS. 4a and 4b are diagrams illustrating one embodiment of a call receiving screen in the method for receiving a call according to another aspect of the present invention. FIGS. 5a to 5c are diagrams illustrating another embodiment of a call receiving screen in the method for receiving a call according to another aspect of the present invention.

Referring to FIGS. 4a to 5c, the method for receiving the incoming call according to the flow chart shown in FIG. 3 of the present invention will be described.

When a call is received from a caller (S100), on the display unit may be displayed not only an 'Incoming Call' button 301, a 'Message' button 302 and an 'End' button 303 but also a 'Receiving-delay' button 310 (S200).

When the call button 301 is pressed, a call is connected with the caller to make conversation on the phone. A preset voice recording can be delivered after the receiving-delay button is pressed. While a preset voice recording is delivering, the call button 301 is pressed and the message delivering is stopped to talk on the phone with the caller immediately. The phone may include a voice phone and a display phone.

Call receiving is rejected and a preset message may be sent to the caller via the message button 302. For example, an automatic message such as 'The call cannot be answered now, if it is urgent, leave a text message' can be delivered or a message directly made by a call receiver can be delivered.

The end button 303 is configured to cut off the terminal from ringing and to reject the call. At this time, a guide recorded message for explaining this situation in which the call cannot be received can be delivered.

The receiving delay button 310 means that the user of the mobile terminal delays call reception for a predetermined time period. The receiving delay button 310 can delay call reception for a preset delay time or the user can set a delay time to be different on all such occasions.

In step S300, when the receiving delay button 310 is pushed, an additional menu 315 is displayed to allow the user to set a delay time as shown in FIG. 4b. The user can select one item from a list divided at predetermined intervals in the additional menu 315 as shown in FIG. 4b. Optionally, the user can set the delay time in a dial type, a wheel type or a Picker View type.

The maximum of the delay time may be differentiated by the call receiver's setting. In some embodiments, 30 seconds may be set as the maximum delay time.

Meanwhile, as shown in FIG. 5a, the delay receiving button may be displayed as a state bar 320. Such a state bar 320 is displayed from 0 seconds to the preset maximum delay time. In the drawings, the maximum delay time is 30 seconds. In case the maximum delay time is set as an infinite time, the call-receiving delay is continuous until the receiver pushes the call button 301, without connecting the call. As shown in FIG. 5b, the receiver can drag the state bar 320 to the right or touch a point of the state bar 320 corresponding to a desired delay time, to set the delay time. The delay time selected can be indicated on the state bar 320 as indicator 321 or displayed as information 323 as shown in FIG. 5b.

In step S400, once the delay time is set, a predetermined comment is sent and the predetermined comment may be a message 'please, wait and the call can be received after the delay time or after the preset delay time is counted in the reverse.' Unless the user presets, a comment preset as a basic comment can be sent. The predetermined comment may be a voice directly recorded by the call receiver or a composite voice.

Such the predetermined comment may include one comment or be provided with a selecting window 325 to allow the call receiver to select one of comments whenever receiving a call as shown in FIG. 5c.

In case one predetermined comment is set, the user pushes the receiving delay button and one predetermined comment is sent to the caller as the call is connected immediately. In case one of the predetermined comments is selectable, the user selects one comment from the selecting window 325 and the selected comment is sent to the caller.

At this time, in case the caller speaks on the mobile terminal as soon as the call is connected, the predetermined comment is sent after the speaking finishes. The voice of the caller is converted into a text which will be transmitted to the receiver.

In the drawing, music delivery, a business inquiry, TTS (Text To Speech) chatting, an "in conference" message, an "at wheel" message, a recorded comment, an automatic response agent and a countdown are shown. The menus of the selecting window 325 are not limited to menus shown in the drawing.

'Music Delivery may deliver a music file set by the receiver or a preset basic music file, while the caller is waiting. In case the receiver selects 'In Conference' or 'At Wheel', a voice message that the receiver is in conference or while driving, asking the caller to wait.

'Recorded comment' may deliver a recorded message of the receiver's voice. A plurality of recorded messages may be preset and a selected one of the recorded messages is sent. 'Countdown' may send a voice that counts down the time remaining to allow the caller to easily recognize how long he or she has to wait.

'Automatic response agent 183' may be an artificial intelligence function configured to generate a suitable answer corresponding to a recognized voice of the caller. The voice of the caller is databased via the voice recognition module 182 and the controller combines a suitable answer to the message.

For example, when the caller speaks "hello? Mr. Kim, the manager, this is Mr. Lee, the assistant at XX Trading Company" on the call, the automatic response agent 183 can respond "Hi, Mr. Lee, What is the trouble?" At this time, the delivered voice configured to make an automatic response is a voice combined with the voice of the call receiver.

In case the call receiver sets the delay time as the infinite time, the automatic response agent can respond until he or she pushes the call button 301.

'ITS chatting' may is a service that provides a text message or voice message by converting a voice into a text or a text into a voice. While call receiving is delayed, the TTS chatting may send the contents the caller speaks on the phone to the call receiver in a text message. In reverse, the text message sent by the receiver is converted into a voice message and the caller can hear the contents of the text message in voice.

When the receiver selects 'TTS Chatting', the caller is informed of a TTS Chatting mode and a message guiding that a voice message the caller leaves can be transmitted to the receiver in text. For example, a message of 'the call will be connected in X seconds. Leave a voice message, the voice message will be transmitted in text' can be sent.

Even in the TTS chatting, the automatic response agent 183 can respond to the call. The automatic response agent 183 sends a voice message saying 'this is Hong Gil Dong's mobile phone and he is moving for this call. Please, leave a message and the message will be delivered in text'. When the caller speaks on the phone, the automatic response agent 183 may notify the caller with a voice saying "the message XXXXX is converted into a text message and the text message is delivered".

In addition, the automatic response agent 183 figures out the contents of the message and asks again. For example, a further question can be asked to figure out the exact meaning such as "if it is Sindorim, is it means near Sindorim Station?" With respect to the time, a response such as "Does it mean 7 p.m.?" can be made.

As another example, a further question can be made such as "Where are you?" in response to the message left by the caller such as "Please, come right away". In other words, if the voice left by the caller wants the caller's moving including 'Go' or 'Come' in a sentence, a question asking the destination can be made.

The response of the agent may be displayed on the receiver's display in a chatting module. When the call receiver inputs a sentence while the agent making response to the caller, the agent can convert the input sentence into a voice and transmit the voice to the caller. When the caller receiver inputs a simple memo, the automatic response agent 183 may create a full sentence and convert the created full sentence into a voice. For example, when the receiver asks "where?" the automatic response agent 183 can create "where is Mr. Hong Gil Dong now?"

Figure 6A:
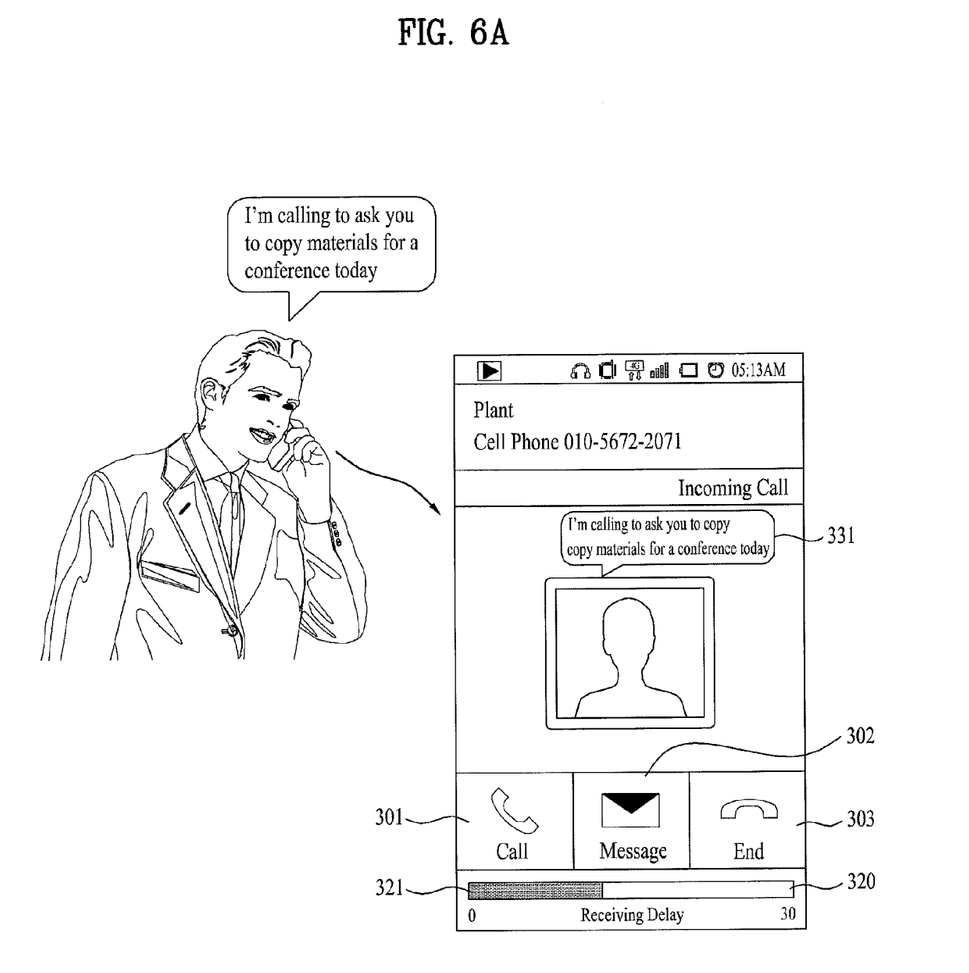
FIGS. 6a and 6b are diagrams illustrating a call-receiving delay time adjusting screen in the method for receiving a call according to another aspect of the present invention.

In step S500, once the caller speaks on the phone as shown in FIG. 6*a*, the voice recognition module 182 may convert the contents into a text message and output the contents on the display unit 151 as a text 331, such that the call receiver may identify what the caller was speaking.

Figure 6B:
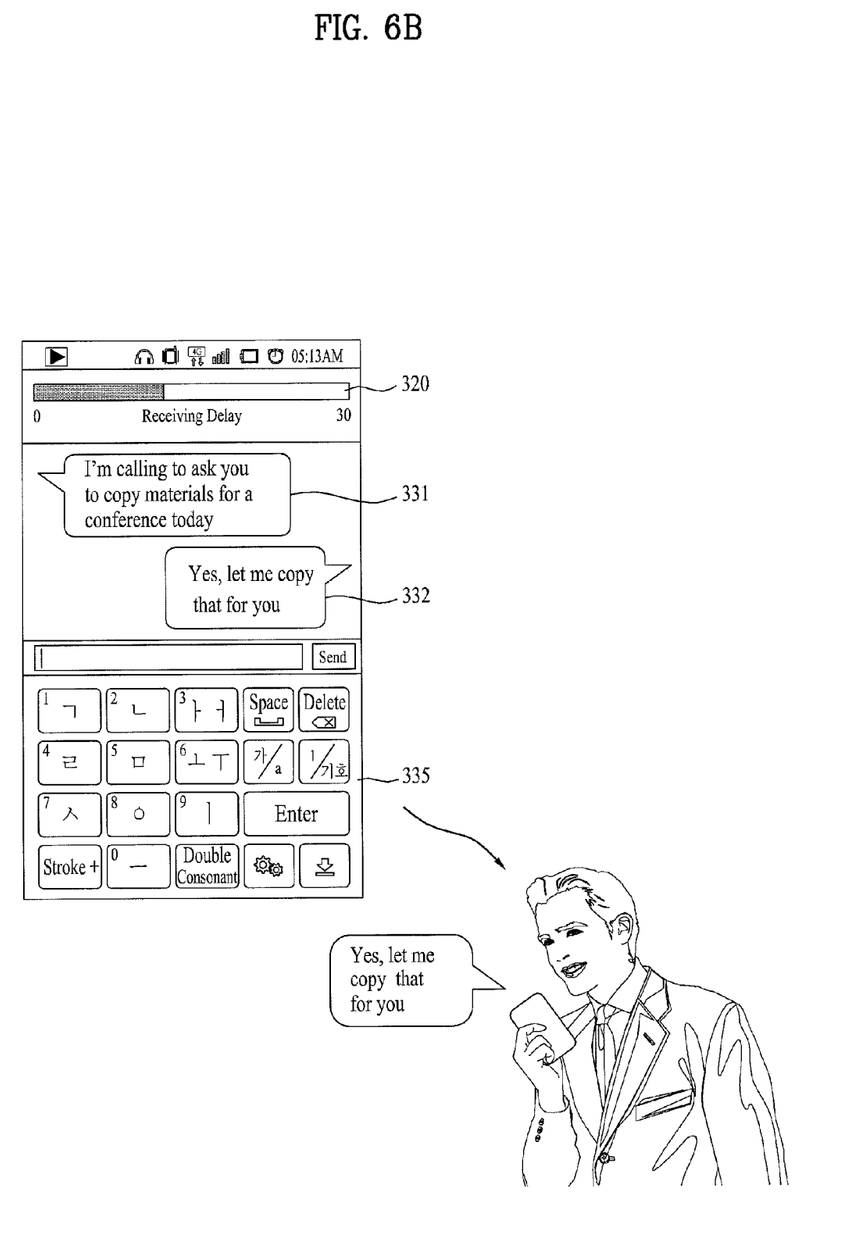

The call receiver may select the message or push an auxiliary answer button (not shown), to activate a text input field 335 as shown in FIG. 6*b* to make response.

Once the call receiver selects "ITS Chatting", a text input field 335 may be outputted on the screen as shown in FIG. 6*b* and a call receiver's mobile terminal displays a chatting screen. The call receiver may input contents of a response message to the caller in text. The input text 332 may be re-converted into a voice and the converted voice may be sent to the caller in step S600.

When the text input field 335 is activated, the screen may be covered and the position of the state bar 320 may be adjusted to be visible.

'Business Inquiry' may convert the voice of the caller into a text via the voice recognition module 182 and displays the converted text to the call receiver, which is a similar technical feature of 'TTS Chatting'. However, there is a difference that a message asking a business to the caller is sent.

Especially, in case the caller is one of persons that have been talked to on the phone with the call receiver, the voices of the call receiver saying greetings or businesses may be recorded at the first call and the voices may be stored for telephone numbers, respectively. In case a call is incoming from the number of a person having a recorded voice stored in the mobile terminal, the call receiver selects 'Business Asking' and a corresponding recorded message is sent.

For example, when the caller is one of friends, the call receiver will say 'hey, what's up'. When the caller is a boss or teacher, the call receiver will say 'this is XXX's speaking, How are you doing? What is the trouble?' For each caller, a greeting of the call receiver is recorded. After that, when 'Business Asking' is selected, the recorded message is sent to induce the caller's speaking.

At this time, the caller cannot recognize a call receiving delay state and can have a natural conversation. Also, repulsion toward an automatic replying message can be reduced and the caller can say a business for the delay time, without waiting, only to save the calling time.

Figure 7A:
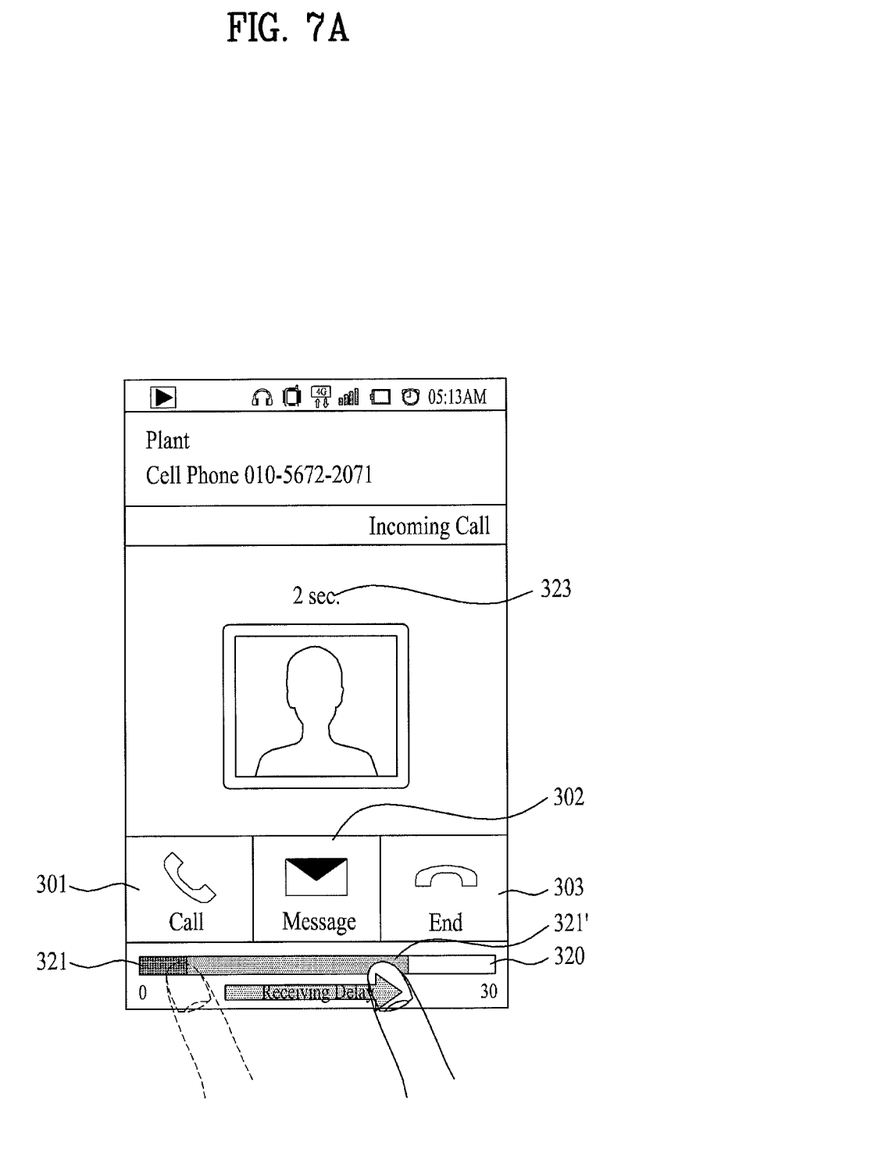
FIGS. 7a and 7b are diagrams illustrating a method for delaying call reception that uses a voice recognizing module in the method for receiving a call according to another aspect of the present invention.
Figure 7B:
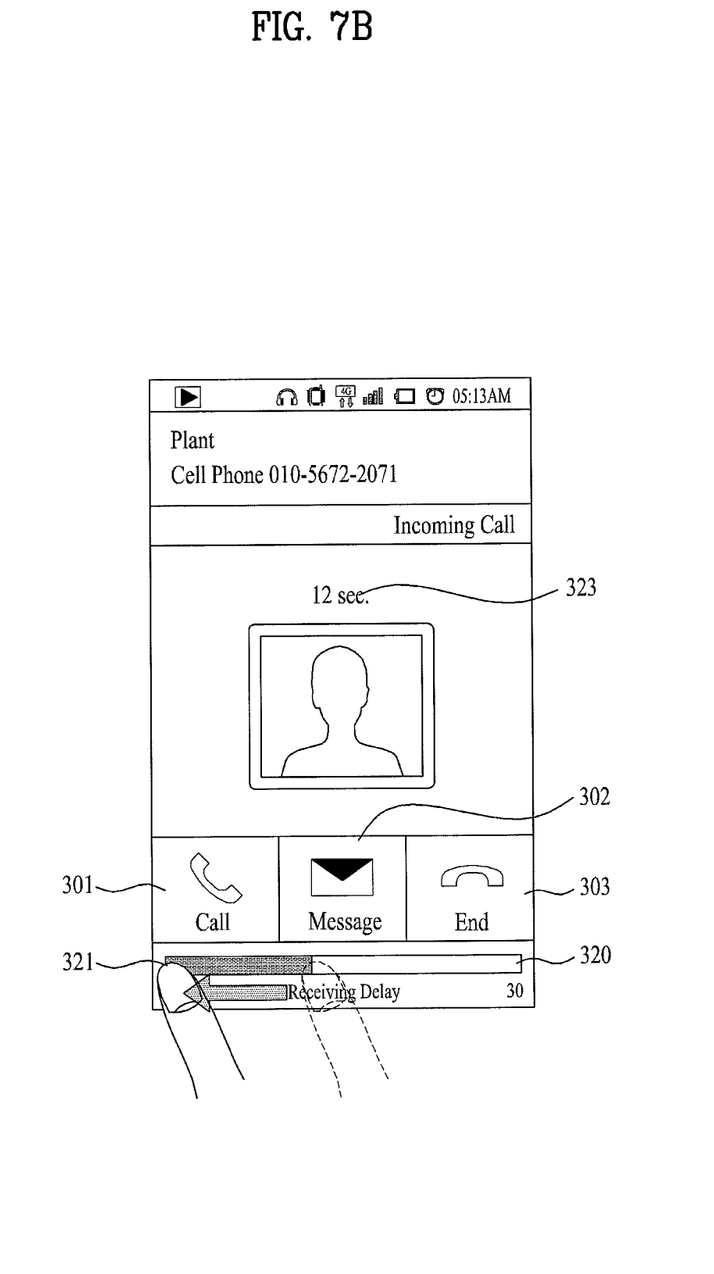

FIGS. 7*a* and 7*b* are diagrams illustrating a call receiving delay time adjusting screen in the method for receiving the call according to another aspect of the present invention. The preset delay time may need to be adjusted in case call connection is possible earlier before the preset delay time passes or the call connection is impossible in the delay time.

As shown in FIG. 7*a*, in case the delay 323 time is running out and it has to be extended, the state bar 320 may be adjusted and the delay time may be extended as shown by the indication 321'. Even in an embodiment not using the state bar 320 of FIGS. 4*a* and 4*b*, the receiving delay button 310 is pushed and the delay time is re-set as shown in FIG. 4*a*.

In this instance, a message on the reset delay time may be transmitted or a new message may be generated to decrease the countdown from the reset delay time.

While a popup is displayed to notice to the call receiver that the call receiving delay time is running out, when the delay time is rarely remaining, the call receiver may be induced to select call connection or delay time extending.

In contrast, as shown in FIG. 7*b*, when call answering is possible although the delaying time is remaining, the time of the state bar 320 is adjusted to '0 second' and the call is connected immediately. Alternatively, when the call receiver pushes the call button 301, the delay time is ignored and the call is connected immediately.

As described above, according to at least one of the embodiments of the present invention, when the call receiver receives the call received by the mobile terminal, while moving, the call receiver may not run to answer the call and may delay the call for a preset time period.

Furthermore, the caller can be guided without the receiver's substantial speaking, or the caller's voice may be converted into the text and the text may be transmitted to the call receiver. Accordingly, the call receiver can make conversation with the caller, without making the caller disconnect the call.

Still further, the voice may be sent, corresponding to the caller. Accordingly, the caller can be made to feel connected to the intended recipient of the call.

Various variations and modifications are possible in the component parts and/or arrangements of the subject combination arrangement within the scope of the disclosure, the drawings and the appended claims.

Although embodiments have been described with reference to a number of illustrative embodiments thereof, it should be understood that numerous other modifications and embodiments can be devised by those skilled in the art that will fall within the spirit and scope of the principles of this disclosure.

The invention claimed is:

1. A method for receiving an incoming call using a mobile terminal, the method comprising:
   receiving an incoming call at the mobile terminal;
   displaying a receiving delay button on a display unit of the mobile terminal responsive to receiving the incoming call;
   allowing a selection of the receiving delay button;
   sending a predetermined comment to a source of the incoming call responsive to the selection of the receiving delay button;
   converting voice signals of the incoming call into a text message; and
   displaying the text message on the display unit,
   wherein the selection of the receiving delay button provides for a selection of a delay time associated with answering the incoming call b selectins one among predetermined durations or by controlling a state bar for selecting the delay time, and
   wherein after selecting the receiving delay button, the delay time is further selectable to be increased, decreased or set to zero.

2. The method for receiving the incoming call according to claim 1, wherein the predetermined comment counts down a preset receiving delay time.

3. The method for receiving the incoming call according to claim 1, wherein the predetermined comment is a message stored after recording a greeting on a first call between the source of the incoming call and the mobile terminal, in a case of a previous call connection between the source of the incoming call and the mobile terminal.

4. The method for receiving the incoming call according to claim 1, wherein the predetermined comment is at least one of a basic preset automatic reply message, a message that the call will be connected after the delay time, a message that a voice message left by a caller will be transmitted in text, a message created by recording a call receiver's voice and a preset melody.

5. The method for receiving the incoming call according to claim 1, wherein when a voice signal from the source of the incoming call is received before sending the predetermined comment, sending the predetermined comment is performed after the voice signal from the source of the incoming call finishes.

6. The method for receiving the incoming call according to claim 1, further comprising:
   selecting a comment which will be sent after the selection of the receiving delay button.

7. The method for receiving the call according to claim 1, wherein sending the predetermined comment further comprises sending a response corresponding to the source of the incoming call by operation of an automatic response agent, when a greeting is sent and the source of the incoming call is detected.

8. The method for receiving the incoming call according to claim 7, wherein the automatic response agent sends a voice combined with a call receiver's voice.

9. The method for receiving the incoming call according to claim 1, further comprising:
   converting a message inputted at the mobile terminal via text into a voice message; and
   transmitting the converted voice message.

10. A mobile terminal comprising:
    a display unit configured to display a receiving delay button on a screen responsive to receiving an incoming call;
    a wireless signal receiving unit configured to receive an incoming call;
    a wireless signal transmitting unit configured to transmit a predetermined comment responsive to a selection of the receiving delay button; and
    a controller configured to control the wireless signal transmitting unit to transmit a predetermined comment to a source of the incoming call, responsive to the selection of the receiving delay button subsequent to receiving the incoming call, and to convert audio data from the source of the incoming call into a text message to display the text message on the display unit responsive to receiving the audio data during a receiving delay,
    wherein the selection of the receiving delay button provides for a selection of a delay time associated with answering the incoming call by selecting one among predetermined durations or by controlling a state bar for selecting the delay time, and
    wherein after selecting the receiving delay button, the delay time is further selectable to be increased, decreased or set to zero.

11. The mobile terminal according to claim 10, wherein the display unit outputs a text message input window when the receiving delay button is selected;
    the controller converts a text message inputted at the mobile terminal during the receiving delay into a voice message; and
    the wireless signal transmitting unit transmits the converted voice message to the source of the incoming call.

12. The mobile terminal according to claim 10, wherein the predetermined comment is a recorded greeting responsive to a previous call with the source of the incoming call, and the mobile terminal further comprises a storage unit configured to store the recorded greeting.

13. The mobile terminal according to claim 10, wherein the display unit is configured to display a selecting window that allows for a selection of the predetermined comment among a plurality of different preset comments.

14. The mobile terminal according to claim 13, wherein the predetermined comment is at least one of a melody, a business inquiry, TTS (Text To Speech) chatting, an "in conference" message, an "at wheel" message, a recorded comment, an automatic response agent and a countdown.

15. The mobile terminal according to claim 10, further comprising an automatic response agent configured to combine a response corresponding to a natural language analyzed thereby is activated,
    wherein the display unit displays a text message automatically responding to the source of the incoming call by the automatic response agent, responsive to the selection of the receiving delay button.

* * * * *